United States Patent
Faitelson et al.

(10) Patent No.: US 10,476,878 B2
(45) Date of Patent: *Nov. 12, 2019

(54) ACCESS PERMISSIONS MANAGEMENT SYSTEM AND METHOD

(71) Applicant: VARONIS SYSTEMS, INC., New York, NY (US)

(72) Inventors: Yakov Faitelson, New York, NY (US); Ohad Korkus, New York, NY (US); Ophir Kretzer-Katzir, Tenafly, NJ (US); Yzhar Keysar, Kohav Yair (IL)

(73) Assignee: Varonis Systems, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/124,658

(22) Filed: Sep. 7, 2018

(65) Prior Publication Data
US 2019/0007413 A1    Jan. 3, 2019

Related U.S. Application Data

(63) Continuation of application No. 15/381,239, filed on Dec. 16, 2016, now Pat. No. 10,102,389, which is a
(Continued)

(51) Int. Cl.
*G06F 17/30* (2006.01)
*H04L 29/06* (2006.01)
(Continued)

(52) U.S. Cl.
CPC ............ *H04L 63/101* (2013.01); *G06F 21/41* (2013.01); *G06F 21/45* (2013.01); *G06F 21/604* (2013.01); *G06F 21/6218* (2013.01)

(58) Field of Classification Search
None
See application file for complete search history.

(56) References Cited

U.S. PATENT DOCUMENTS

| 5,465,387 A | 11/1995 | Mukherjee |
| 5,761,669 A | 6/1998 | Montague et al. |

(Continued)

FOREIGN PATENT DOCUMENTS

| CN | 1588889 A | 3/2005 |
| CN | 1860723 A | 11/2006 |

(Continued)

OTHER PUBLICATIONS

A NFOA dated Aug. 26, 2016, which issued during the prosecution of Applicant's U.S. Appl. No. 14/508,390.
(Continued)

*Primary Examiner* — Aleksandr Kerzhner
*Assistant Examiner* — Eddy Cheung

(57) ABSTRACT

An access permissions management system including a hierarchical access permissions repository including access permissions relating to data elements arranged in a data element hierarchy, wherein some of the data elements have only access permissions which are inherited from ancestral data elements, some of the multiplicity of data elements are prevented from having inherited access permissions and thus have only unique access permissions which are not inherited and some of the data elements are not prevented from having inherited access permissions and have not only inherited access permissions but also unique access permissions which are not inherited, some of which unique access permissions possibly being redundant with inherited access permissions, and an access permissions redundancy prevention engine operative to ascertain which of the unique access permissions are redundant with inherited access permissions and not to store the unique access permissions which are redundant with inherited access permissions in the repository.

2 Claims, 2 Drawing Sheets

Related U.S. Application Data continuation of application No. 13/159,903, filed on Jun. 14, 2011, now Pat. No. 9,680,839, which is a continuation-in-part of application No. 13/014,762, filed on Jan. 27, 2011, now Pat. No. 8,805,884.

(60) Provisional application No. 61/477,662, filed on Apr. 21, 2011.

(51) Int. Cl.
| | | |
|---|---|---|
| G06F 21/41 | (2013.01) | |
| G06F 21/45 | (2013.01) | |
| G06F 21/60 | (2013.01) | |
| G06F 21/62 | (2013.01) | |

(56) References Cited

U.S. PATENT DOCUMENTS

| | | |
|---|---|---|
| 5,889,952 A | 3/1999 | Hunnicutt et al. |
| 5,899,991 A | 5/1999 | Karch |
| 6,023,765 A | 2/2000 | Kuhn |
| 6,178,505 B1 | 1/2001 | Schneider et al. |
| 6,308,173 B1 | 10/2001 | Glasser et al. |
| 6,338,082 B1 | 1/2002 | Schneider |
| 6,393,468 B1 | 5/2002 | McGee |
| 6,772,350 B1 | 8/2004 | Belani et al. |
| 6,928,439 B2 | 8/2005 | Satoh |
| 6,993,137 B2 | 1/2006 | Fransdonk |
| 6,996,577 B1 | 2/2006 | Kiran et al. |
| 7,007,032 B1 | 2/2006 | Chen et al. |
| 7,017,183 B1 | 3/2006 | Frey et al. |
| 7,031,984 B2 | 4/2006 | Kawamura et al. |
| 7,068,592 B1 | 6/2006 | Duvaut et al. |
| 7,124,272 B1 | 10/2006 | Kennedy et al. |
| 7,185,192 B1 | 2/2007 | Kahn |
| 7,219,234 B1 | 5/2007 | Ashland et al. |
| 7,305,562 B1 | 12/2007 | Bianco et al. |
| 7,403,925 B2 | 7/2008 | Schlesinger et al. |
| 7,421,740 B2 | 9/2008 | Fey et al. |
| 7,529,748 B2 | 5/2009 | Wen et al. |
| 7,555,482 B2 | 6/2009 | Korkus |
| 7,580,934 B2 | 8/2009 | Futatsugi |
| 7,606,801 B2 | 10/2009 | Faitelson et al. |
| 7,716,240 B2 | 5/2010 | Lim |
| 7,743,420 B2 | 6/2010 | Shulman et al. |
| 7,849,496 B2 | 12/2010 | Ahern et al. |
| 7,983,264 B2 | 7/2011 | Etheridge |
| 8,239,925 B2 | 8/2012 | Faitelson et al. |
| 8,327,419 B1 | 12/2012 | Korablev et al. |
| 8,447,829 B1 | 5/2013 | Geller et al. |
| 8,533,787 B2 | 9/2013 | Faitelson et al. |
| 8,621,610 B2 | 12/2013 | Oberheide et al. |
| 8,639,724 B1 | 1/2014 | Sorenson, III et al. |
| 8,683,560 B1 | 3/2014 | Brooker et al. |
| 8,805,884 B2 | 8/2014 | Faitelson et al. |
| 8,909,673 B2 | 12/2014 | Faitelson et al. |
| 9,679,148 B2 | 6/2017 | Faitelson et al. |
| 9,680,839 B2 | 6/2017 | Faitelson et al. |
| 10,102,389 B2 | 10/2018 | Faitelson et al. |
| 2002/0002557 A1 | 1/2002 | Straube et al. |
| 2002/0026592 A1 | 2/2002 | Gavrila et al. |
| 2002/0174307 A1 | 11/2002 | Yoshida et al. |
| 2003/0048301 A1 | 3/2003 | Menninger |
| 2003/0051026 A1 | 3/2003 | Carter et al. |
| 2003/0074580 A1 | 4/2003 | Knouse et al. |
| 2003/0188198 A1 | 10/2003 | Holdsworth et al. |
| 2003/0231207 A1 | 12/2003 | Huang |
| 2004/0030915 A1 | 2/2004 | Sameshima et al. |
| 2004/0186809 A1 | 9/2004 | Schlesinger et al. |
| 2004/0205342 A1 | 10/2004 | Roegner |
| 2004/0249847 A1 | 12/2004 | Wang et al. |
| 2004/0254919 A1 | 12/2004 | Giuseppini |
| 2004/0260952 A1 | 12/2004 | Newman et al. |
| 2005/0007619 A1 | 1/2005 | Minato |
| 2005/0044396 A1 | 2/2005 | Vogel et al. |
| 2005/0044399 A1 | 2/2005 | Dorey |
| 2005/0065823 A1 | 3/2005 | Ramraj et al. |
| 2005/0086529 A1 | 4/2005 | Buchsbaum |
| 2005/0108206 A1 | 5/2005 | Lam et al. |
| 2005/0120054 A1 | 6/2005 | Shulman et al. |
| 2005/0187937 A1 | 8/2005 | Kawabe et al. |
| 2005/0203881 A1 | 9/2005 | Sakamoto et al. |
| 2005/0246762 A1 | 11/2005 | Girouard et al. |
| 2005/0278334 A1 | 12/2005 | Fey et al. |
| 2005/0278785 A1 | 12/2005 | Lieberman |
| 2006/0037062 A1 | 2/2006 | Araujo et al. |
| 2006/0064313 A1 | 3/2006 | Steinbarth et al. |
| 2006/0090208 A1 | 4/2006 | Smith |
| 2006/0184459 A1 | 8/2006 | Parida |
| 2006/0184530 A1 | 8/2006 | Song et al. |
| 2006/0271523 A1 | 11/2006 | Brookler et al. |
| 2006/0277184 A1 | 12/2006 | Faitelson et al. |
| 2006/0294578 A1 | 12/2006 | Burke et al. |
| 2007/0033340 A1 | 2/2007 | Tulskie et al. |
| 2007/0061487 A1 | 3/2007 | Moore et al. |
| 2007/0073698 A1 | 3/2007 | Kanayama et al. |
| 2007/0094265 A1 | 4/2007 | Korkus |
| 2007/0101387 A1 | 5/2007 | Hua et al. |
| 2007/0112743 A1 | 5/2007 | Giampaolo et al. |
| 2007/0121501 A1 | 5/2007 | Bryson |
| 2007/0136603 A1 | 6/2007 | Kuecuekyan |
| 2007/0156659 A1 | 7/2007 | Lim |
| 2007/0156693 A1 | 7/2007 | Soin |
| 2007/0198608 A1 | 8/2007 | Prahlad et al. |
| 2007/0203872 A1 | 8/2007 | Flinn et al. |
| 2007/0214497 A1 | 9/2007 | Montgomery et al. |
| 2007/0244899 A1 | 10/2007 | Faitelson et al. |
| 2007/0261121 A1 | 11/2007 | Jacobson |
| 2007/0266006 A1 | 11/2007 | Buss |
| 2007/0276823 A1 | 11/2007 | Borden et al. |
| 2007/0282855 A1 | 12/2007 | Chen et al. |
| 2008/0031447 A1 | 2/2008 | Geshwind et al. |
| 2008/0034205 A1 | 2/2008 | Alain et al. |
| 2008/0034402 A1 | 2/2008 | Botz et al. |
| 2008/0071785 A1 | 3/2008 | Kabra et al. |
| 2008/0091682 A1 | 4/2008 | Lim |
| 2008/0097998 A1 | 4/2008 | Herbach |
| 2008/0104663 A1 | 5/2008 | Tokutani et al. |
| 2008/0162707 A1 | 7/2008 | Beck et al. |
| 2008/0172720 A1 | 7/2008 | Botz et al. |
| 2008/0184330 A1 | 7/2008 | Lal et al. |
| 2008/0270462 A1 | 10/2008 | Thomsen |
| 2008/0271157 A1 | 10/2008 | Faitelson et al. |
| 2008/0306954 A1 | 12/2008 | Hornqvist |
| 2009/0031418 A1 | 1/2009 | Matsuda et al. |
| 2009/0100058 A1 | 4/2009 | Faitelson et al. |
| 2009/0119298 A1 | 5/2009 | Faitelson et al. |
| 2009/0150981 A1 | 6/2009 | Amies et al. |
| 2009/0182715 A1 | 7/2009 | Falkenberg |
| 2009/0198892 A1 | 8/2009 | Alvarez et al. |
| 2009/0249446 A1 | 10/2009 | Jenkins et al. |
| 2009/0265780 A1 | 10/2009 | Korkus et al. |
| 2009/0320088 A1 | 12/2009 | Gill et al. |
| 2010/0011438 A1 | 1/2010 | Bartley et al. |
| 2010/0023491 A1 | 1/2010 | Huang et al. |
| 2010/0037324 A1 | 2/2010 | Grant et al. |
| 2010/0058434 A1 | 3/2010 | Chusing et al. |
| 2010/0070881 A1 | 3/2010 | Hanson et al. |
| 2010/0076972 A1 | 3/2010 | Baron et al. |
| 2010/0262625 A1 | 10/2010 | Pittenger |
| 2011/0010758 A1 | 1/2011 | Faitelson et al. |
| 2011/0060916 A1 | 3/2011 | Faitelson et al. |
| 2011/0061093 A1 | 3/2011 | Korkus et al. |
| 2011/0061111 A1 | 3/2011 | Faitelson et al. |
| 2011/0126111 A1 | 5/2011 | Gill et al. |
| 2011/0184989 A1 | 7/2011 | Faitelson et al. |
| 2011/0296490 A1 | 12/2011 | Faitelson et al. |
| 2012/0011161 A1 | 1/2012 | Marathe |
| 2012/0078965 A1 | 3/2012 | Laitkorpi et al. |
| 2012/0221550 A1 | 8/2012 | Korkus et al. |
| 2012/0271853 A1 | 10/2012 | Faitelson et al. |
| 2012/0271855 A1 | 10/2012 | Faitelson et al. |
| 2012/0272294 A1 | 10/2012 | Faitelson et al. |

(56) References Cited

U.S. PATENT DOCUMENTS

2012/0291100 A1 11/2012 Faitelson et al.
2015/0026778 A1 1/2015 Faitelson et al.
2017/0098091 A1 4/2017 Faitelson et al.

FOREIGN PATENT DOCUMENTS

| CN | 101316273 A | 12/2008 |
| CN | 101692278 A | 4/2010 |
| JP | 2007-075950 A | 3/2007 |
| JP | 012-132276 A | 7/2012 |
| WO | 2011/030324 A1 | 3/2011 |
| WO | 2011/148376 A2 | 12/2011 |
| WO | 2011/148377 A1 | 12/2011 |
| WO | 2012/101620 A1 | 8/2012 |
| WO | 2012/101621 A1 | 8/2012 |
| WO | 2012/143920 A2 | 10/2012 |

OTHER PUBLICATIONS

A NFOA dated Aug. 28, 2012, which issued during the prosecution of Applicant's U.S. Appl. No. 12/673,691.
A NFOA dated Sep. 14, 2012, which issued during the prosecution of U.S. Appl. No. 12/861,967.
A NFOA dated Sep. 16, 2010, which issued during the prosecution of Applicant's U.S. Appl. No. 11/871,028.
A NFOA dated Sep. 19, 2012, which issued during the prosecution of Applicant's U.S. Appl. No. 13/303,826.
A NFOA dated Oct. 31, 2008, which issued during the prosecution of Applicant's U.S. Appl. No. 11/635,736.
A NFOA dated Dec. 11, 2015, which issued during the prosecution of Applicant's U.S. Appl. No. 13/378,115.
A NFOA dated Dec. 14, 2010, which issued during the prosecution of Applicant's U.S. Appl. No. 11/786,522.
NOA dated Feb. 9, 2017, which issued during the prosecution of Applicant's U.S. Appl. No. 14/508,390.
NOA dated Feb. 10, 2017, which issued during the prosecution of U.S. Appl. No. 13/159,903.
NOA dated Apr. 12, 2012, which issued during the prosecution of Applicant's U.S. Appl. No. 11/789,884.
NOA dated Jun. 11, 2018, which issued during the prosecution of Applicant's U.S. Appl. No. 15/381,239.
NOA dated Jul. 11, 2014, which issued during the prosecution of U.S. Appl. No. 13/303,826.
NOA dated Aug. 12, 2016, which issued during the prosecution of U.S. Appl. No. 13/159,903.
A RR dated Nov. 21, 2012, which issued during the prosecution Applicant's U.S. Appl. No. 13/106,023.
An Interview Summary dated Sep. 11, 2014, which issued during the prosecution of Applicant's U.S. Appl. No. 13/378,115.
An Internationai Search Report and a Written Opinion both dated Oct. 1, 2012, which issued during the prosecution of Applicant's PCT/IL2012/000240.
An Internationai Search Report and a Written Opinion both dated Nov. 15, 2011, which issued during the prosecution of Applicant's PCT/IL11/00408.
U.S. Appl. No. 60/688,486, filed Jun. 7, 2005.
U.S. Appl. No. 61/477,662, filed Apr. 21, 2011.
USPTO AA dated Jan. 8, 2018 in connection with U.S. Appl. No. 15/381,239.
USPTO AA dated Jan. 22, 2014 in connection with U.S. Appl. No. 13/378,115.
USPTO AA dated Mar. 24, 2016 in connection with U.S. Appl. No. 13/159,903.
USPTO AA dated Jun. 7, 2013 in connection with U.S. Appl. No. 13/303,826.
USPTO AA dated Jun. 15, 2015 in connection with U.S. Appl. No. 13/378,115.
USPTO AA dated Dec. 27, 2013 in connection with U.S. Appl. No. 13/378,115.
A Patent Board Decision on Appeal dated Aug. 29, 2017, which issued during the prosecution of U.S. Appl. No. 13/378,115.
A FOA dated Mar. 25, 2013, which issued during the prosecution of Applicant's U.S. Appl. No. 13/303,826.
A FOA dated Mar. 25, 2013, which issued during the prosecution of Applicant's U.S. Appl. No. 13/384,452.
A FOA dated Apr. 18, 2011, which issued during the prosecution of Applicant's U.S. Appl. No. 11/786,522.
A FOA dated Apr. 28, 2011, which issued during the prosecution of Applicant's U.S. Appl. No. 11/871,028.
A FOA dated Aug. 1, 2008, which issued during the prosecution of Applicant's U.S. Appl. No. 11/258,256.
A FOA dated Sep. 6, 2013, which issued during the prosecution of Applicant's U.S. Appl. No. 13/378,115.
A FOA dated Sep. 20, 2011, which issued during the prosecution of Applicant's U.S. Appl. No. 11/786,522.
A FOA dated Oct. 18, 2017, which issued during the prosecution of Applicant's U.S. Appl. No. 15/381,239.
A FOA dated Oct. 30, 2014, which issued during the prosecution of U.S. Appl. No. 13/159,903.
A FOA dated Dec. 9, 2015, which issued during the prosecution of U.S. Appl. No. 13/159,903.
A FOA dated Dec. 14, 2010, which issued during the prosecution of Applicant's U.S. Appl. No. 11/789,884.
A FOA dated Dec. 26, 2014, which issued during the prosecution of Applicant's U.S. Appl. No. 13/378,115.
An Interview Summary dated Mar. 5, 2018, which issued during the prosecution of U.S. Appl. No. 15/381,239.
An Interview Summary dated Mar. 7, 2016, which issued during the prosecution of U.S. Appl. No. 13/159,903.
An Interview Summary dated Mar. 7, 2016, which issued during the prosecution of U.S. Appl. No. 13/378,115.
An Interview Summary dated Apr. 15, 2014, which issued during the prosecution of U.S. Appl. No. 13/159,903.
An Interview Summary dated May 12, 2015, which issued during the prosecution of U.S. Appl. No. 13/378,115.
An Interview Summary dated May 13, 2013, which issued during the prosecution of U.S. Appl. No. 13/159,903.
An Interview Summary dated May 15, 2013, which issued during the prosecution of U.S. Appl. No. 13/378,115.
An Interview Summary dated Jul. 17, 2017, which issued during the prosecution of U.S. Appl. No. 15/381,239.
An Interview Summary dated Sep. 9, 2015, which issued during the prosecution of U.S. Appl. No. 13/378,115.
An Interview Summary dated Sep. 10, 2015, which issued during the prosecution of U.S. Appl. No. 13/159,903.
An Interview Summary dated Sep. 10, 2014, which issued during the prosecution of U.S. Appl. No. 13/159,903.
An Interview Summary dated Nov. 14, 2013, which issued during the prosecution of U.S. Appl. No. 13/378,115.
An Interview Summary dated Nov. 22, 2013, which issued during the prosecution of U.S. Appl. No. 13/159,903.
An Interview Summary dated Nov. 22, 2017, which issued during the prosecution of U.S. Appl. No. 15/381,239.
A NFOA dated Jan. 12, 2018, which issued during the prosecution of Applicant's U.S. Appl. No. 13/378,115.
A NFOA dated Jan. 15, 2013, which issued during the prosecution of Applicant's U.S. Appl. No. 13/159.903.
A NFOA dated Feb. 12, 2008, which issued during the prosecution of U.S. Appl. No. 11/258,256.
A NFOA dated Mar. 13, 2012, which issued during the prosecution of U.S. Appl. No. 11/786,522.
A NFOA dated Mar. 13, 2014, which issued during the prosecution of Applicant's U.S. Appl. No. 13/159,903.
A NFOA dated Apr. 4, 2013, which issued during the prosecution Applicant's U.S. Appl. No. 13/378,115.
A NFOA dated Apr. 19, 2017, which issued during the prosecution of Applicant's U.S. Appl. No. 15/381,239.
A NFOA dated Apr. 25, 2012, which issued during the prosecution of Applicant's U.S. Appl. No. 12/498,675.
A NFOA dated Jun. 4, 2014, which issued during the prosecution of U.S. Appl. No. 13/303,826.

(56) References Cited

OTHER PUBLICATIONS

A NFOA dated Jun. 10, 2015, which issued during the prosecution of U.S. Appl. No. 13/159,903.
A NFOA dated Jun. 22, 2012, which issued during the prosecution of Applicant's U.S. Appl. No. 12/814,807.
A NFOA dated Jul. 5, 2012, which issued during the prosecution of Applicant's U.S. Appl. No. 12/772,450.
A NFOA dated Jul. 8, 2014, which issued during the prosecution of Applicant's U.S. Appl. No. 13/378,115.
A NFOA dated Jul. 9, 2010, which issued during the prosecution of Applicant's U.S. Appl. No. 11/789,884.
A NFOA dated Jul. 11, 2012, which issued during the prosecution of Applicant's U.S. Appl. No. 13/014,762.
Sahadeb DE, et al; "Secure Access Control in a Multi-user Geodatabase," available on the Internet at the URL htto://www10.qiscafe.com. 2005, 10 pages.
Ebell: "Access Centrol Lists—alfrescowiki" (Jun. 5, 2008).
Findutils; GNU Project—Free Software Foundation (FSF), 3 pages, Nov. 2006.
Genunix; "Writing Filesystems—VFS and Vnode Interfaces", 5 pages, Oct. 2007.
S.R. Kleiman; "Vnodes: An Architecture for Multiple File System Types in Sun UNIX", USENIX Association: Summer Conference Proceedings, Atlanta 1986; 10 pages.
Dennis Lu et al: "Jesse Dyer" (Jul. 15, 2004).
Sara C. Madeira and Arlindo L. Oliveira; Biclustering Algorithms for Biological data Analysis: A Survey; Mar. 2004; http://www.cs.princeton.edu/courses/archive/spr05/cos598E/bib/bicluster.pdf.
Sara C. Madeira; Clustering, Fuzzy Clustering and Biclustering: An Overview; p. 31 to 53, Jun. 27, 2003.
Varonis; "Accelerating Audits with Automation: Understanding Who's Accessing Your Unstructured Data", Oct. 8, 2007, 7 pages.
"Entitlement reviews: A Practitioner's Guide" by Varonis, 2007.
Varonis; "White Paper: The Business Case for Data Governance", dated Mar. 27, 2007, 8 pages.
Alex Woodie; "Varonis Prevents Unauthorized Access to Unstructured Data", Four Hundred Stuff, vol. 7, No. 9, Jul. 31, 2007, 6 pages.
DatAdvantage User Guide by Varonis, Version 1.0, Aug. 30, 2005.
DatAdvantage User Guide by Varonis, Version 2.0, Aug. 24, 2006.
DatAdvantage User Guide by Varonis, Version 2.5, Nov. 27, 2006.
DatAdvantage User Guide by Varonis, Version 2.6, Dec. 15, 2006.
DatAdvantage User Guide by Varonis, Version 2.7, Feb. 6, 2007.
DatAdvantage User Guide by Varonis, Version 3.0, Jun. 20, 2007.
A List of database tables in DatAdvantage 2.7, Feb. 6, 2007.
A List of database tables in DatAdvantage 3.0, Jun. 20, 2007.
Supplementary European Search Report dated Apr. 17, 2015 which issued during the prosecution of Applicant's European App No. 11856923.5.
Supplementary European Search Report dated May 3, 2016, which issued during the prosecution of Applicant's European App No. 12774249.2.
European Search Report dated May 13, 2015, which issued during the prosecution of Applicant's European App No. 11857276.7.
An English translation of an Office Action dated Jun. 26, 2015, which issued during the prosecution of Chinese Patent Application No. 201180066261.8.
An English translation of an Office Action dated Jun. 29, 2016, which issued during the prosecution of Chinese Patent Application No. 201280029360.3.
An English translation of an Office Action dated Aug. 5, 2015, which issued during the prosecution of Chinese Patent Application No. 201180065969.1.
An English translation of an Office Action dated Mar. 15, 2016, which issued during the prosecution of Chinese Patent Application No. 201180065969.1.
An English translation of an Office Action dated Aug. 30, 2016, which issued during the prosecution of Chinese Patent Application No. 201180065969.1.
An English translation of an Office Action dated Feb. 27, 2017, which issued during the prosecution of Chinese Patent Application No. 201180065969.1.
An International Preliminary Report on Patentability dated Mar. 13, 2012, which issued during the prosecution of Applicant's PCT/IL2010/000069.
An International Preliminary Report on Patentability dated May 12, 2015, which issued during the prosecution of Applicant's PCT/IL2012/000163.
An International Preliminary Report on Patentability dated Jul. 30, 2013, which issued during the prosecution of Applicant's PCT/IL2011/000903.
An International Preliminary Report on Patentability dated Jul. 31, 2012, which issued during the prosecution of Applicant's PCT/IL2011/000065.
An International Preliminary Report on Patentability dated Jul. 31, 2012, which issued during the prosecution of Applicant's PCT/IL2011/000078.
An International Preliminary Report on Patentability dated Jul. 30, 2013, which issued during the prosecution of Applicant's PCT/IL2011/000902.
An International Search Report and a Written Opinion both dated Apr. 13, 2012, which issued during the prosecution of Applicant's PCT/IL2011/000902.
An International Search Report and a Written Opinion both dated Apr. 13, 2012, which issued during the prosecution of Applicant's PCT/IL2011/000903.
An International Search Report and a Written Opinion both dated May 9, 2011, which issued during the prosecution of Applicant's PCT/IL10/01090.
An International Search Report and a Written Opinion both dated May 20, 2010, which issued during the prosecution of Applicant's PCT/IL10/00069.
An International Search Report and a Written Opinion both dated May 23, 2011, which issued during the prosecution of Applicant's PCT/IL11/00065.
An International Search Report and a Written Opinion both dated May 24, 2011 which issued during the prosecution of Applicant's PCT/IL11/00077.
An International Search Report and a Written Opinion both dated May 25, 2011, which issued during the prosecution of Applicant's PCT/IL11/00078.
An International Search Report and a Written Opinion both dated Jun. 13, 2011 which issued during the prosecution of Applicant's PCT/IL11/00076.
An International Search Report and a Written Opinion both dated Jun. 14, 2011 which issued during the prosecution of Applicant's PCT/IL11/00066.
An International Search Report and a Written Opinion both dated Aug. 31, 2012 which issued during the prosecution of Applicant's PCT/IL2012/000163.
U.S. Appl. No. 13/159,903, filed Jun. 14, 2011 published as 2012/0271853, issued as U.S. Pat. No. 9,680,839.
U.S. Appl. No. 13/014,762, filed Jan. 27, 2011 published as 2011/0184989, issued as U.S. Pat. No. 8,805,884.
U.S. Appl. No. 15/381,239, filed Dec. 16, 2016 published as 2017/0098091, issued as U.S. Pat. No. 10,102,389.

ACCESS PERMISSIONS MANAGEMENT SYSTEM AND METHOD

REFERENCE TO RELATED APPLICATIONS

Reference is made to U.S. Provisional Patent Application Ser. No. 61/477,662, filed Apr. 21, 2011 and entitled "ACCESS PERMISSIONS MANAGEMENT SYSTEM AND METHOD", the disclosure of which is hereby incorporated by reference and priority of which is hereby claimed pursuant to 37 CFR 1.78(a) (4) and (5)(i).

Reference is also made to U.S. patent application Ser. No. 13/014,762, filed Jan. 27, 2011, and entitled "AUTOMATIC RESOURCE OWNERSHIP ASSIGNMENT SYSTEMS AND METHODS", the disclosure of which is hereby incorporated by reference and priority of which is hereby claimed pursuant to 37 CFR 1.78(a) (1) and (2)(i).

Reference is also made to the following patents and patent applications, owned by assignee, the disclosures of which are hereby incorporated by reference:

U.S. Pat. Nos. 7,555,482 and 7,606,801;

U.S. Published Patent Application Nos. 2007/0244899, 2008/0271157, 2009/0100058, 2009/0119298, 2009/0265780, 2011/0060916 and 2011/0061111; and U.S. patent application Ser. No. 12/673,691.

FIELD OF THE INVENTION

The present invention relates to access permissions management.

BACKGROUND OF THE INVENTION

The following patent publications are believed to represent the current state of the art:

U.S. Pat. Nos. 5,465,387; 5,899,991; 6,338,082; 6,393,468; 6,928,439; 7,031,984; 7,068,592; 7,403,925; 7,421,740; 7,555,482, 7,606,801 and 7,743,420; and U.S. Published Patent Application Nos.: 2003/0051026; 2004/0249847; 2005/0108206; 2005/0203881; 2005/0086529; 2006/0064313; 2006/0184530; 2006/0184459; 2007/0203872; 2007/0244899; 2008/0271157; 2009/0100058; 2009/0119298; 2009/0265780; 2011/0060916 and 2011/0061111.

SUMMARY OF THE INVENTION

The present invention provides improved systems and methodologies for access permissions redundancy prevention.

There is thus provided in accordance with a preferred embodiment of the present invention an access permissions management system including a hierarchical access permissions repository including a multiplicity of access permissions relating to a multiplicity of data elements which are arranged in a data element hierarchy and wherein some of the multiplicity of data elements have associated therewith only access permissions which are inherited from data elements ancestral thereto, some of the multiplicity of data elements are prevented from having associated therewith inherited access permissions and thus have associated therewith only unique access permissions which are not inherited and some of the multiplicity of data elements are not prevented from having associated therewith inherited access permissions and have associated therewith not only inherited access permissions but also unique access permissions which are not inherited, some of which unique access permissions possibly being redundant with inherited access permissions, and an access permissions redundancy prevention engine operative to ascertain which of the unique access permissions are redundant with inherited access permissions and responsively thereto not to store the unique access permissions which are redundant with inherited access permissions in the repository.

There is also provided in accordance with another preferred embodiment of the present invention an access permissions management system including a hierarchical access permissions repository including a multiplicity of access permissions relating to a multiplicity of data elements which are arranged in a data element hierarchy and wherein some of the multiplicity of data elements are inherited data elements, which have associated therewith only access permissions which are inherited from data elements ancestral thereto, some of the multiplicity of data elements are protected data elements, which are prevented from having associated therewith inherited access permissions and thus have associated therewith only unique access permissions which are not inherited and some of the multiplicity of data elements are hybrid data elements, which are not prevented from having associated therewith inherited access permissions and have associated therewith not only inherited access permissions but also unique access permissions which are not inherited, some of which unique access permissions possibly being redundant with inherited access permissions, and an access permissions overlap prevention engine operative to ascertain which of the unique access permissions associated with a protected data element are identical to access permissions associated with a data element immediately above the protected data element in the hierarchy and responsively thereto not to store the unique access permissions which are associated with the protected data element.

There is further provided in accordance with yet another preferred embodiment of the present invention an access permissions management method including maintaining a hierarchical access permissions repository including a multiplicity of access permissions relating to a multiplicity of data elements which are arranged in a data element hierarchy and wherein some of the multiplicity of data elements have associated therewith only access permissions which are inherited from data elements ancestral thereto, some of the multiplicity of data elements are prevented from having associated therewith inherited access permissions and thus have associated therewith only unique access permissions which are not inherited and some of the multiplicity of data elements are not prevented from having associated therewith inherited access permissions and have associated therewith not only inherited access permissions but also unique access permissions which are not inherited, some of which unique access permissions possibly being redundant with inherited access permissions, and preventing access permissions redundancy by ascertaining which of the unique access permissions are redundant with inherited access permissions and responsively thereto not to store the unique access permissions which are redundant with inherited access permissions in the repository.

There is yet further provided in accordance with still another preferred embodiment of the present invention an access permissions management method including maintaining a hierarchical access permissions repository including a multiplicity of access permissions relating to a multiplicity of data elements which are arranged in a data element hierarchy and wherein some of the multiplicity of data elements are inherited data elements, which have associated therewith only access permissions which are inherited from data elements ancestral thereto, some of the multiplicity of data elements are protected data elements, which are prevented from having associated therewith inherited access permissions and thus have associated therewith only unique access permissions which are not inherited and some of the multiplicity of data elements are hybrid data elements, which are not prevented from having associated therewith inherited access permissions and have associated therewith not only inherited access permissions but also unique access permissions which are not inherited, some of which unique access permissions possibly being redundant with inherited access permissions, and preventing access permissions overlap by ascertaining which of the unique access permissions associated with a protected data element are identical to access permissions associated with a data element immediately above the protected data element in the hierarchy and responsively thereto not to store the unique access permissions which are associated with the protected data element.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 1:
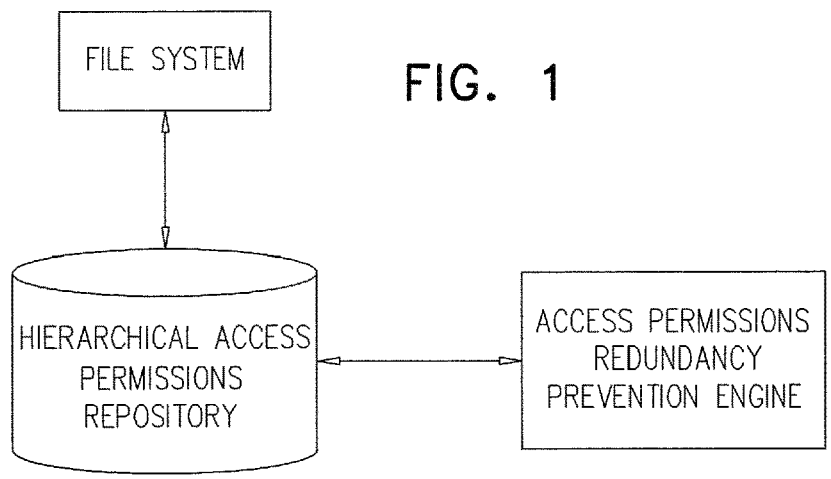
FIG. 1 is a simplified block diagram illustration of an access permissions management system, constructed and operative in accordance with a preferred embodiment of the present invention.
Figure 2:
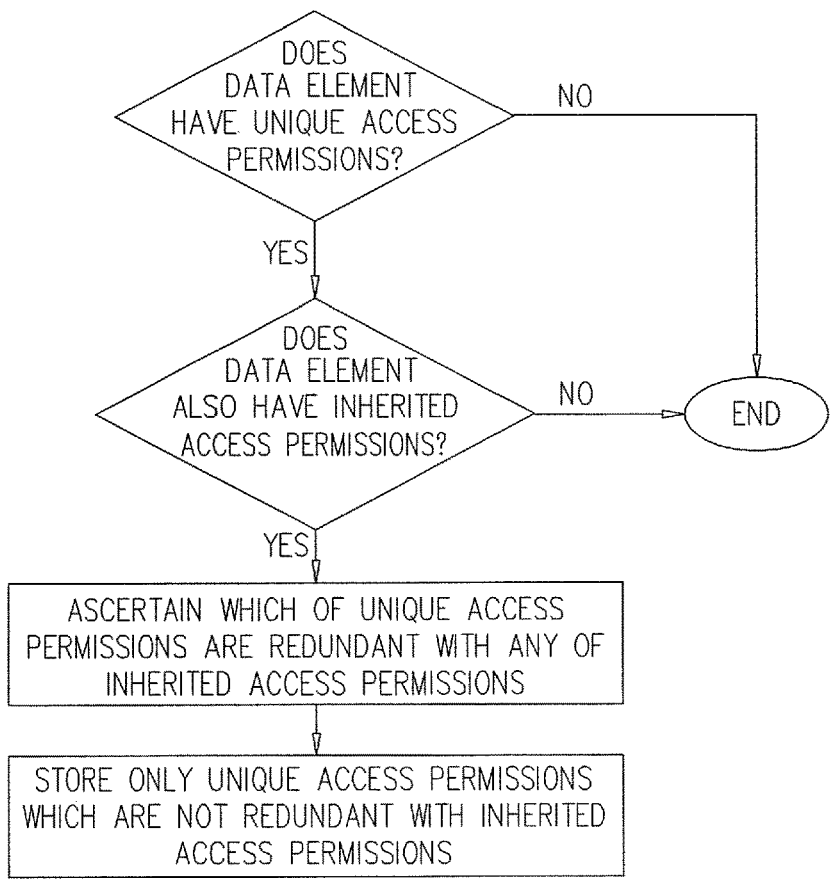
FIG. 2 is a simplified flowchart indicating steps in the operation of the access permissions management system of FIG. 1.

Reference is now made to FIG. 1, which is a simplified block diagram illustration of an access permissions management system, constructed and operative in accordance with a preferred embodiment of the present invention, and to FIG. 2, which is a simplified flowchart indicating steps in the operation of the access permissions management system of FIG. 1. The access permissions management system of FIGS. 1 & 2 is preferably suitable for operating in an enterprise computer network including multiple disparate clients, computer hardware resources and computer software resources, and a file system comprising a data element hierarchy.

Preferably, the system of FIGS. 1 & 2 includes a hierarchical access permissions repository including a multiplicity of access permissions relating to a multiplicity of data elements which are arranged in the data element hierarchy and wherein some of the multiplicity of data elements have associated therewith only access permissions which are inherited from data elements ancestral thereto, some of the multiplicity of data elements are prevented from having associated therewith inherited access permissions and thus have associated therewith only unique access permissions which are not inherited, and some of the multiplicity of data elements are not prevented from having associated therewith inherited access permissions and have associated therewith not only inherited access permissions but also unique access permissions which are not inherited, some of which unique access permissions possibly being redundant with inherited access permissions. It is appreciated that prevention of association of inherited access permissions with a data element may be accomplished, for example, by configuring of the data element, such as by an IT Administrator, as a data element which is not allowed to inherit access permissions from any of its ancestors.

In accordance with a preferred embodiment of the present invention, the system of FIGS. 1 & 2 also includes an access permissions redundancy prevention engine operative to ascertain which of the unique access permissions are redundant with inherited access permissions and responsively thereto not to store the unique access permissions which are redundant with inherited access permissions in the repository.

As shown in FIG. 2, for each data element in the data element hierarchy the system ascertains whether the data element has unique access permissions associated therewith. Thereafter, the system ascertains whether the data element also has inherited access permissions associated therewith. Thereafter, the system ascertains whether any of the unique access permissions associated with the data element are redundant with any of the inherited access permissions associated with the data element. Thereafter, for each data element, the system stores in the repository only the unique access permissions which are not redundant with any of the inherited access permissions.

Figure 3:
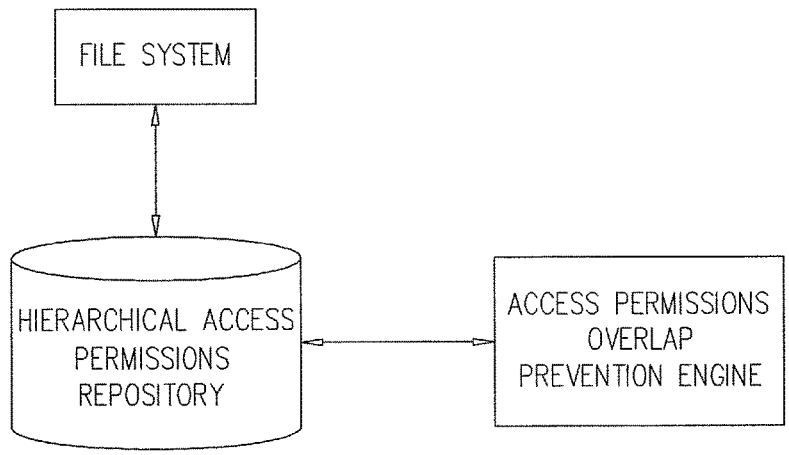
FIG. 3 is a simplified block diagram illustration of an access permissions management system, constructed and operative in accordance with another preferred embodiment of the present invention.
Figure 4:
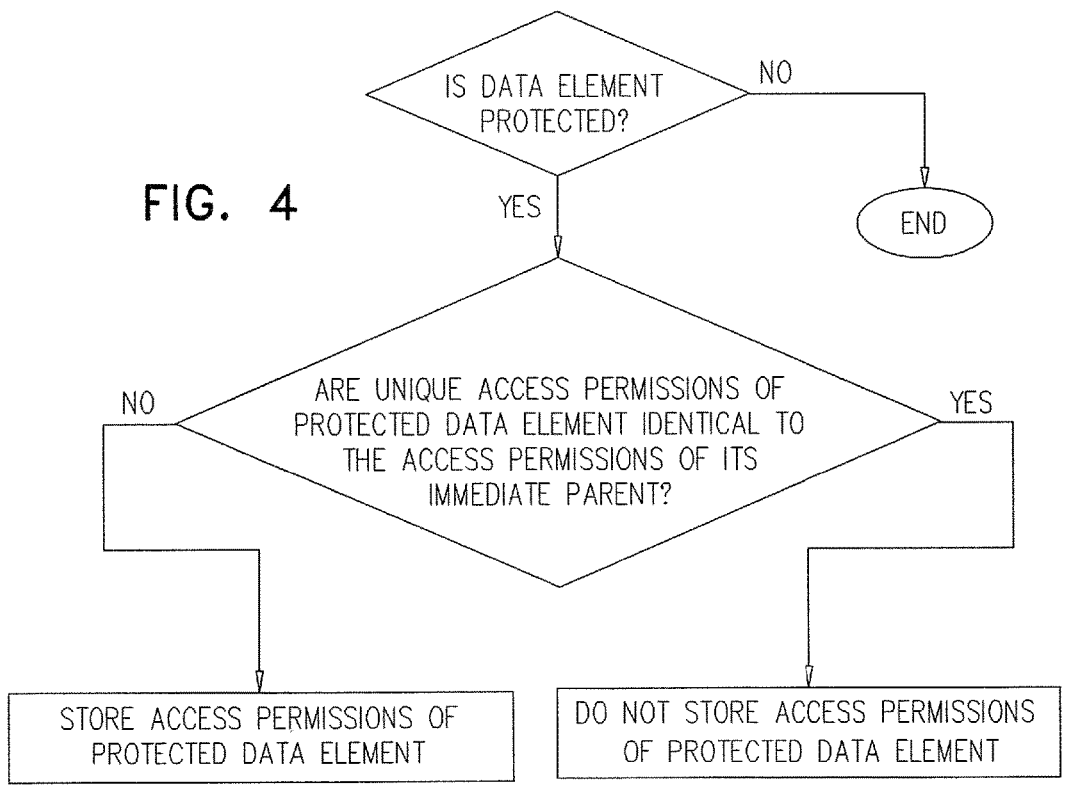
FIG. 4 is a simplified flowchart indicating steps in the operation of the access permissions management system of FIG. 3.

Reference is now made to FIG. 3, which is a simplified block diagram illustration of an access permissions management system, constructed and operative in accordance with another preferred embodiment of the present invention, and to FIG. 4, which is a simplified flowchart indicating steps in the operation of the access permissions management system of FIG. 3. The access permissions management system of FIGS. 3 & 4 is preferably suitable for operating in an enterprise computer network including multiple disparate clients, computer hardware resources and computer software resources, and a file system comprising a data element hierarchy.

Preferably, the system of FIGS. 3 & 4 includes a hierarchical access permissions repository including a multiplicity of access permissions relating to a multiplicity of data elements which are arranged in the data element hierarchy and wherein some of the multiplicity of data elements are inherited data elements, which have associated therewith only access permissions which are inherited from data elements ancestral thereto, some of the multiplicity of data elements are protected data elements, which are prevented from having associated therewith inherited access permissions and thus have associated therewith only unique access permissions which are not inherited, and some of the multiplicity of data elements are hybrid data elements, which are not prevented from having associated therewith inherited access permissions and have associated therewith not only inherited access permissions but also unique access permissions which are not inherited, some of which unique access permissions possibly being redundant with inherited access permissions.

In accordance with a preferred embodiment of the present invention, the system of FIGS. 3 & 4 also includes an access permissions overlap prevention engine operative to ascertain which of the unique access permissions associated with a protected data element are identical to access permissions associated with a data element immediately above the protected data element in the hierarchy and responsively thereto not to store the unique access permissions which are associated with the protected data element.

As shown in FIG. 4, for each protected data element in the data element hierarchy the system ascertains whether the unique access permissions associated therewith are identical to the access permissions associated with the data element immediately above the protected data element in the hierarchy. Thereafter, only for protected data elements which have unique access permissions associated therewith that are not identical to the access permissions associated with the data element immediately above the protected data element in the hierarchy, the system stores in the repository the unique access permissions associated with the protected data element.

It will be appreciated by persons skilled in the art that the present invention is not limited by what has been particularly shown and described hereinabove. Rather, the invention also includes various combinations and subcombinations of the features described hereinabove as well as modifications and variations thereof, which would occur to persons skilled in the art upon reading the foregoing and which are not in the prior art.

The invention claimed is:

1. A data governance system for use with an existing organizational file system and an access control list associated therewith, said data governance system comprising a non-transitory, tangible computer-readable medium in which computer program instructions are stored, which instructions, when read by a computer, cause the computer to automatically manage access permissions, said system comprising:
   a probe engine communicating with said organizational file system and with said access control list and being operative to collect access information from said organizational file system and from said access control list in an ongoing manner,
   a redundancy reducing engine receiving an output from said probe engine and providing a redundancy reduced information stream; and
   a redundancy reduced information database receiving and storing said redundancy reduced information stream;
   said redundancy-reduced information database storing information relating to a subset of a set of user groups having access permissions to said organizational file system, said subset being created by said redundancy reducing engine,
   said redundancy reducing engine being operative:
      to ascertain which of a multiplicity of user groups having access permissions to said organizational file system are unique user groups, said unique user groups having access permissions to said organizational file system which are not inherited from other user groups;
      to ascertain which of said multiplicity of user groups having access permissions to said organizational file system are inherited user groups, said inherited user groups having access permissions to said organizational file system which are inherited from other user groups;
      to ascertain whether any of said unique user groups are redundant with any of said inherited user groups; and
      responsive to said ascertaining whether any of said unique user groups are redundant with any of said inherited user groups, to eliminate from said multiplicity of user groups having access permissions to said organization file system, said unique user groups having access permissions to said organization file system which are redundant with said inherited user groups.

2. An access permissions management method comprising:
   communicating with an organizational file system and with an access control list associated therewith. and collecting access information from said organizational file system and from said access control list in an ongoing manner,
   responsive to said collecting access information:
      ascertaining which of a multiplicity of user groups having access permissions to said organization file system are unique user groups, said unique user groups having access permissions which are not inherited from other user groups;
      ascertaining which of said multiplicity of user groups having access permissions to said organization file system are inherited user groups, said inherited user groups having access permissions to said organizational file system which are inherited from other user groups;
      ascertaining whether any of said unique user groups are redundant with any of said inherited user groups; and
      responsive to said ascertaining whether any of said unique user groups are redundant with any of said inherited user groups, eliminating from said multiplicity of user groups having access permissions to said organization file system, said unique user groups which are redundant with said inherited user groups; and
   providing and storing a redundancy reduced information stream, said redundancy reduced information stream comprising information relating to a subset of a set of user groups having access permissions to said organization file system.

* * * * *